(12) United States Patent
Taylor

(10) Patent No.: US 6,450,268 B1
(45) Date of Patent: Sep. 17, 2002

(54) APPARATUS FOR DIVOT REPAIR

(75) Inventor: Curtis N. Taylor, Spruce Pine, NC (US)

(73) Assignee: Taylor Pritchard, Inc., Tallahassee, FL (US)

( * ) Notice: Subject to any disclaimer, the term of this patent is extended or adjusted under 35 U.S.C. 154(b) by 0 days.

(21) Appl. No.: 09/630,182

(22) Filed: Aug. 1, 2000

(51) Int. Cl.[7] ............................................. A01B 3/02
(52) U.S. Cl. ..................... 172/354; 111/130; 239/650; 222/544
(58) Field of Search ................................ 172/329, 351, 172/354, 356, 371; 222/544, 160; 221/185; 111/130, 92, 95; 239/650, 652

(56) References Cited

U.S. PATENT DOCUMENTS

| | | | |
|---|---|---|---|
| 2,051,672 A | * | 8/1936 | Baker |
| 2,489,162 A | * | 11/1949 | Schulman |
| 2,639,654 A | | 5/1953 | Baunsgard et al. ............ 97/59 |
| 2,772,815 A | * | 12/1956 | Bye |
| 3,745,945 A | * | 7/1973 | Wilson |
| 3,749,034 A | * | 7/1973 | Bergius et al. |
| 3,896,947 A | * | 7/1975 | Pearce |
| 4,090,457 A | | 5/1978 | Roberts ........................ 111/82 |
| 4,168,749 A | | 9/1979 | Adams ...................... 172/251 |
| 4,206,714 A | * | 6/1980 | Walsh |
| 4,315,580 A | * | 2/1982 | Beckworth |
| 4,316,625 A | * | 2/1982 | Goon et al. |
| 4,614,160 A | * | 9/1986 | Curlett |
| 4,729,493 A | * | 3/1988 | Cole et al. |
| 4,760,807 A | * | 8/1988 | Keller |
| 4,846,286 A | | 7/1989 | McNeely et al. ............ 172/379 |
| 4,854,391 A | | 8/1989 | Johnson ...................... 172/354 |
| 4,884,805 A | | 12/1989 | Patterson ..................... 273/32 |
| 4,896,797 A | * | 1/1990 | Tumlin |
| 4,921,144 A | * | 5/1990 | Vardar |
| 5,101,744 A | * | 4/1992 | Nolan |
| 5,131,570 A | | 7/1992 | Sawyer, III ................. 222/175 |
| 5,464,066 A | * | 11/1995 | Doucet |
| 5,465,869 A | * | 11/1995 | Scheicher et al. |
| 5,730,226 A | | 3/1998 | Kendall ...................... 172/378 |
| 6,113,310 A | * | 9/2000 | Hesse, Jr. |
| 6,267,269 B1 | * | 7/2001 | Kates |

FOREIGN PATENT DOCUMENTS

AU 13086/88 3/1988

* cited by examiner

Primary Examiner—Victor Batson
(74) Attorney, Agent, or Firm—MacCord Mason PLLC

(57) ABSTRACT

A divot repair device for transporting a mixture of fill material and dispensing the fill material into divots in order to fill and thereby fix the divots by promoting turf growth in the location of the divots, including a hopper for carrying a predetermined mixture of fill material, the hopper having an inlet and an outlet; a wheeled carrier connected to the hopper for transporting the hopper by an individual across an area from one divot location to a second divot location; a dispensing valve connected to the hopper for selectively dispensing the fill material; and a smoother connected to the hopper.

11 Claims, 5 Drawing Sheets

APPARATUS FOR DIVOT REPAIR

BACKGROUND OF THE INVENTION

The present invention relates generally to transportable divot repair devices and, more particularly, to a device that is readily transportable by an individual to various locations having divots created in turf grass and that selectively dispenses a premixed fill mixture into the divots to assist in the repair of the divots.

Divots are formed as gouges in turf and, in many instances, will not be repaired by the natural growth of the turf. Instead, some intervention is necessary to assist the turf in repairing the destroyed area. One widely used solution is to fill the divot with a mixture of, typically, sand and seed to allow for new turf growth in the affected area. Alternatively, divots are filled with top dressing or sand. The fill mixture can vary depending on the requirements of turf, season and personal preference. Filling of divots is desirable on, for example, golf courses so that the turf will grow into the area of the divot. It is also desirable that the fill mixture be approximately level with the surrounding ground so that, in the typical golf course application, golf balls do not come to rest in the depression or roll off a mound of fill material.

At most golf courses, golf carts are equipped with a container filled with a seed and sand mixture, or a dressing, and it is recommended that the individual golfer spread the seed and sand mixture in the divot created by most golf swings. Such a method is not reliable. In most instances, golf courses are forced to fill the divots that remain unfilled by the individual golfers.

Typically, groundskeepers have manual laborers fill divots manually. Typically this is done in the morning before the golf course opens for play. With this manual method, laborers are dispatched around the golf course with buckets or other devices containing the fill mixture. The laborers walk from divot to divot and dispense the mixture into each divot with an implement such as a small cup or trowel. The laborer is typically forced to continually stand and bend over in order to ensure effective filling of the divot. The laborer also must carry the fill mixture, and return to refill his supply of fill mixture. Because of the time required in such a method, laborers cannot be dispatched to all areas where divots need to be repaired, but instead concentrate on certain areas, typically tee box areas. Areas in fairways are not typically maintained in as good condition. In any event, the manual method is time consuming and labor intensive.

Certain devices have been contemplated in solving this time consuming, and thereby expensive, process. The previous devices have not adequately addressed all of the variables of this problem. For example, it must be recognized by any solution that divots have a variety of depths and vary in size (width and length). The amount of fill mixture cannot therefore be predetermined for every divot. Each divot requires a differing amount of fill mixture that can only be determined upon visual inspection of the size and shape of the divot. Any dispenser must be movable to allow fill material to be spread throughout the area of the divot. Additionally, divot repair must be done so that the fill material is tamped down into the divot and leveled off with the surrounding area so as to keep the ground level.

The invention disclosed in U.S. Pat. No. 5,131,570 appears to dispense a fill mixture into a divot using a spring loaded rod that is pressed into the divot. The seed mixture is dispensed from a tubular housing but the spring loaded rod end may prevent the divot from becoming filled fully, and may cause additional damage to the turf from the pogo-stick action required to dispense the fill material. Australian Patent Application 13086/88 relates to a sand hopper that is designed for attachment to a golf cart. The sand hopper remains on the golf cart and, after the golf cart is driven to a position to place the hopper over the divot, the hopper is foot-operated to dispense a predetermined amount of fill mixture. The amount of fill mixture cannot be varied according to the depth of the divot, and the fill mixture cannot be spread over a greater or smaller area according to the size of the divot.

Thus, there remains a need for a new and improved divot repair device that is not affixed to a golf cart but readily transportable by an individual over a rather expansive area while still carrying a large supply of fill material. Preferably, the device will allow the operator to selectively dispense different amounts of fill mixture into divots as required and also be movable while dispensing the mixture so that the operator can fill the entire divot regardless of size. Further, the device preferably provides for a means to smooth the fill mixture once located in the divot without additional effort.

SUMMARY OF THE INVENTION

The present invention fulfills this need in the art by providing a divot repair tool for repairing divots on golf courses including a carriage for movement over the golf course ground from one divot to another by a user, and a hopper mounted on the carriage for holding a divot repair mixture, the hopper having an outlet near the ground arranged for selective, controlled dispensing of divot repair mixture from the hopper to fill a divot near the divot repair tool. The divot repair tool may be moved by a user from one divot to another, and divot repair mixture may be controllably dispensed from the hopper to a divot to be repaired. Then, the divot repair tool may be moved to another divot on the golf course for controlled dispensing of divot repair mixture to the other divot.

In one embodiment the divot repair device includes a hopper for carrying a predetermined mixture of fill material, the hopper adapted to be transported by an individual across an area from a first divot location to a second divot location, a valve assembly connected to the hopper for selectively dispensing the fill material; and a dispenser exit for the hopper located above the divot locations when the hopper is transported adjacent the divot locations. This permits the hopper to be transported to a divot, the valve assembly to be actuated to open the dispenser exit, and dispense fill material into a divot to be repaired.

The apparatus preferably includes a smoother connected to the hopper in such a manner that the smoother contacts the fill mixture after the fill mixture is dispensed. The smoother may take the form of a blade member having a leading edge and a trailing edge. The blade member typically includes a bottom surface, and the leading edge is curved upwardly from the bottom surface. The trailing edge is preferably curved upwardly from the bottom surface. In a preferred embodiment, the smoother is pivotably connected to the hopper. Desirably, stop pins on the smoother are located to restrict pivotable movement of the smoother in the downward direction.

The adaptation of the hopper for transport by an individual may take the form of a wheeled carrier connected to the hopper. The wheeled carrier preferably includes first and second wheels connected on opposite sides of the hopper and a handle connected to the hopper. Typically, the outlet is located at the lower end of the hopper. The hopper may include a removable cover for the inlet.

The dispensing valve may take the form of a gate valve which can be selectively opened and closed. Typically, the gate valve is selectively opened by hand operation. A trigger may be located on the wheeled carrier and a cable connecting the trigger to the gate valve. The dispensing valve typically includes an exit port located immediately adjacent to the divot location.

The invention also provides a method for filling divots that have been created in turf grass, including moving a hopper over the ground immediately adjacent a divot; and dispensing an amount of fill mixture into the divot from the hopper.

The method preferably includes smoothing and compacting the fill mixture located within the divot by movement of the hopper. Dispensing preferably includes selectively controlling a trigger to selectively open a valve to release a variable amount of fill mixture from the hopper.

DESCRIPTION OF THE PREFERRED EMBODIMENTS

Figure 1:
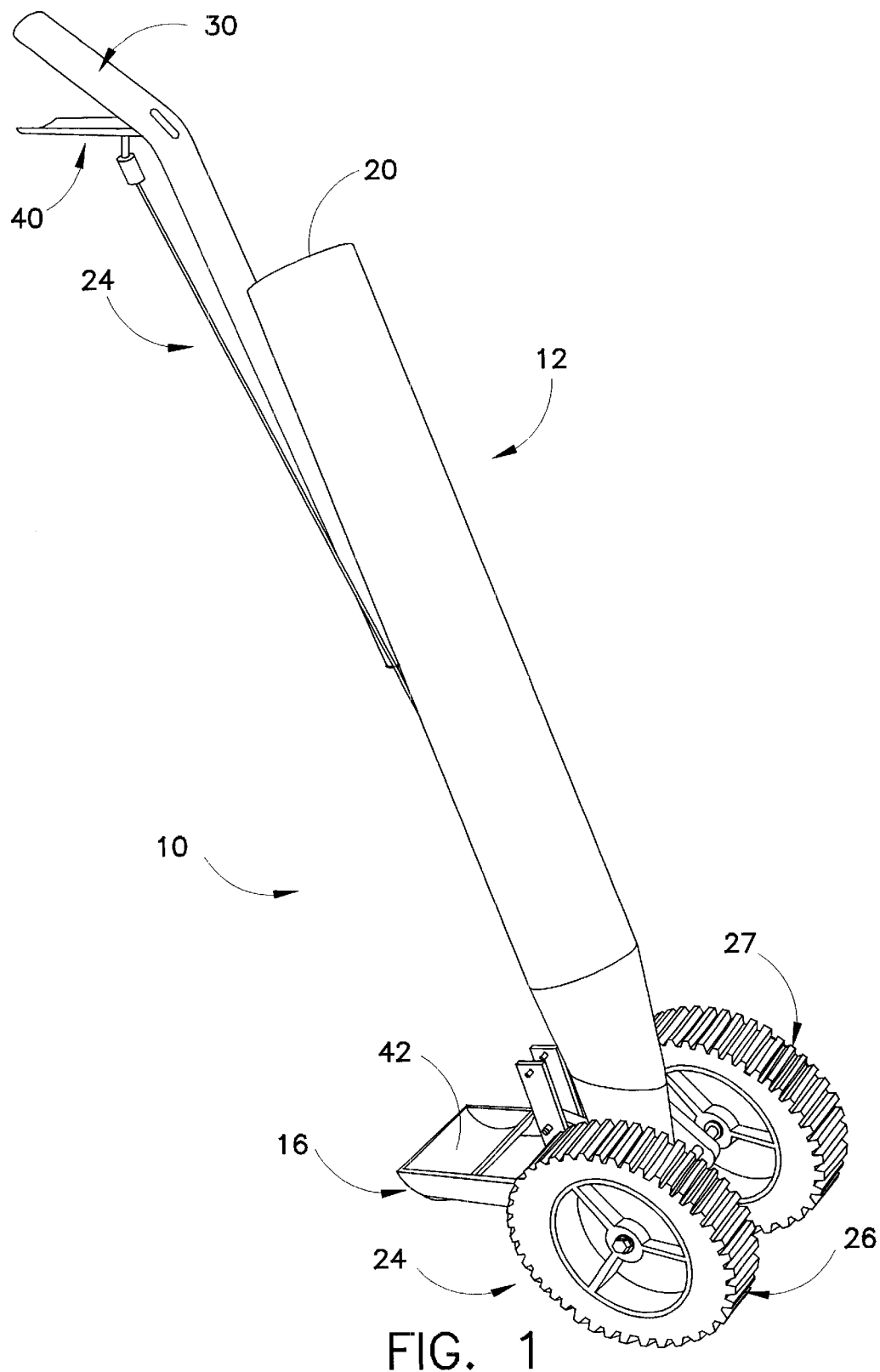
FIG. 1 is a perspective view illustrating the divot repair apparatus constructed according to one embodiment of the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a divot repair apparatus, generally designated 10, is shown constructed according to the present invention. The divot repair apparatus 10 has two major subparts: a hopper 12 and a valve assembly 14.

Figure 2:
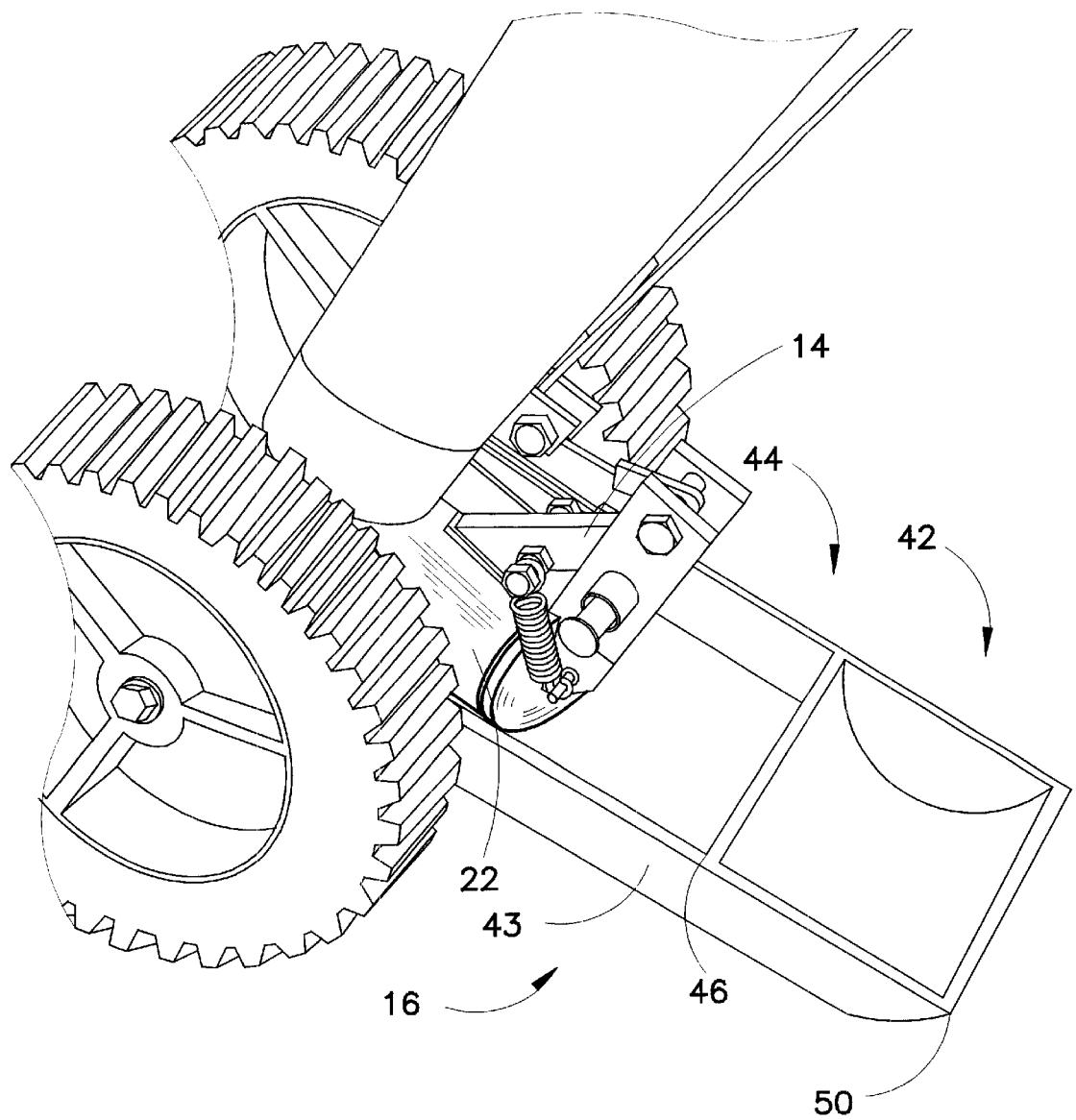
FIG. 2 is an enlarged rear perspective view of the lower part of the divot repair apparatus shown in FIG. 1.

The hopper 12 is adapted to be transported by an individual. As can be seen in FIGS. 1 and 2, the hopper 12 has an inlet 20 and an outlet 22. In the preferred embodiment shown in FIGS. 1 through 4, the valve assembly 14 is connected to outlet 22. The valve assembly 14 is constructed so as to open and close based on selective operation by an individual. The valve assembly 14 is constructed so that the fill mixture exits in close proximity to the ground onto which it is to be dispensed. In this embodiment, the hopper 12 is mounted on a carriage such as first and second wheels 26 and 27 and has a handle 30. In a preferred embodiment, a trigger 40 is located on the handle 30, and the trigger selectively opens and closes the valve assembly 14.

A smoother 16 has a blade 42 and a mounting means 44. The smoother 16 performs the function of leveling and compacting the fill mixture that is dispensed from the hopper 12. The smoother is attached to the hopper 12 by mount 44. The mount 44 may be any mechanical connection but preferably a pivotable connection. As seen in FIG. 2, the mount 44 includes two arms 43 extending forwardly from the blade 42 to the pivot connection to the bottom of the hopper. If the smoother 16 is pivotably connected to the hopper, the smoother 16 is preferably provided with stop pins or ears that extend inwardly from the arm 43 to abut protrusions from the hopper. The stop pins 52 stop the smoother 16 from pivoting downwardly past a predetermined location. In a preferred embodiment, smoother 16 is connected to the rear of the divot repair device so that forward motion of the apparatus 10 drags the smoother over the fill mixture that has been dispensed into the divot. The stop pins 52 allow the operator to transport the divot repair device with the smoother 16 off of the ground when not in operation, by rotating the device 10 as depicted in FIG. 1 in the clockwise direction.

Turning now to FIG. 2, there is shown a detail view of the smoother 16 constructed according to a preferred embodiment of the present invention. The smoother 16 preferably has a curved leading edge 46 and a curved trailing edge 50.

Figure 3:
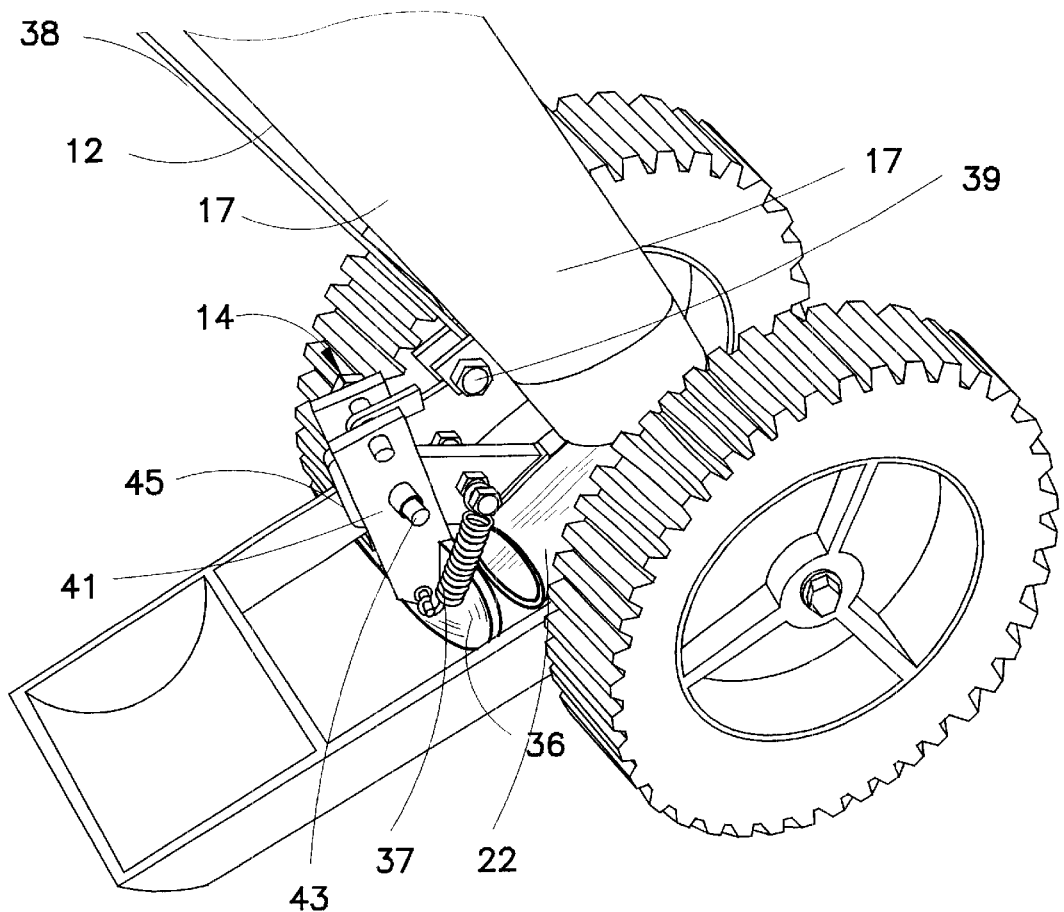
FIG. 3 is a different perspective view of the rear portion of the lower part of the divot repair shown in FIG. 1.

The valve assembly 14 is shown in FIG. 3. In this embodiment, the valve assembly 14 includes a valve plate 36 which covers an outlet 22. The valve assembly 14 is constructed so as to allow the operator to selectively open and close the valve plate 36 during operation. The valve assembly 14 may be constructed so that the valve plate 36 is selectively opened and closed by a trigger 40. In the preferred embodiment, the trigger 40 is hand operated and may include a lever mounted to the carriage. The trigger 40 may be attached to a cable 38 that opens the valve plate 36 in opposition to a spring 37 that acts to close the valve plate 36. In the embodiment shown in FIG. 3, cable 38 passes downwardly past turnbuckle 39 and attaches to lever 41 to which valve plate 36 is attached. Lever 41 is pivotally mounted at pin 43 onto a boss 45 extending rearwardly from the hopper 12. While a cable operated valve actuator is disclosed, it will be apparent to those of skill in the art that other means, including electronic means and other mechanical means, can be utilized to open and close the valve plate 36.

In operation, fill mixture is placed into the hopper 12. Using the wheels, an individual transports the divot repair device 10 so that the valve assembly 14 is oriented above the divot to be filled. The operator selectively opens the valve plate 36 by engaging the trigger 40. While the valve plate 36 remains open, the operator can move the divot repair device 10 along the ground so that fill mixture is dispensed into the entire area of the divot up to the desired depth. In the embodiment shown, the amount of valve opening can be controlled by the operator. The operator then transports the divot repair device 10 forwardly away from this divot, and this movement drags the smoother 16 over the dispensed fill mixture so the fill mixture is thereby compacted into the divot and smoothed. No additional smoothing or tamping is generally needed. The device 10 can then be transported, by rolling on wheels 26 and 27, to another divot to be repaired in like manner.

Figure 4:
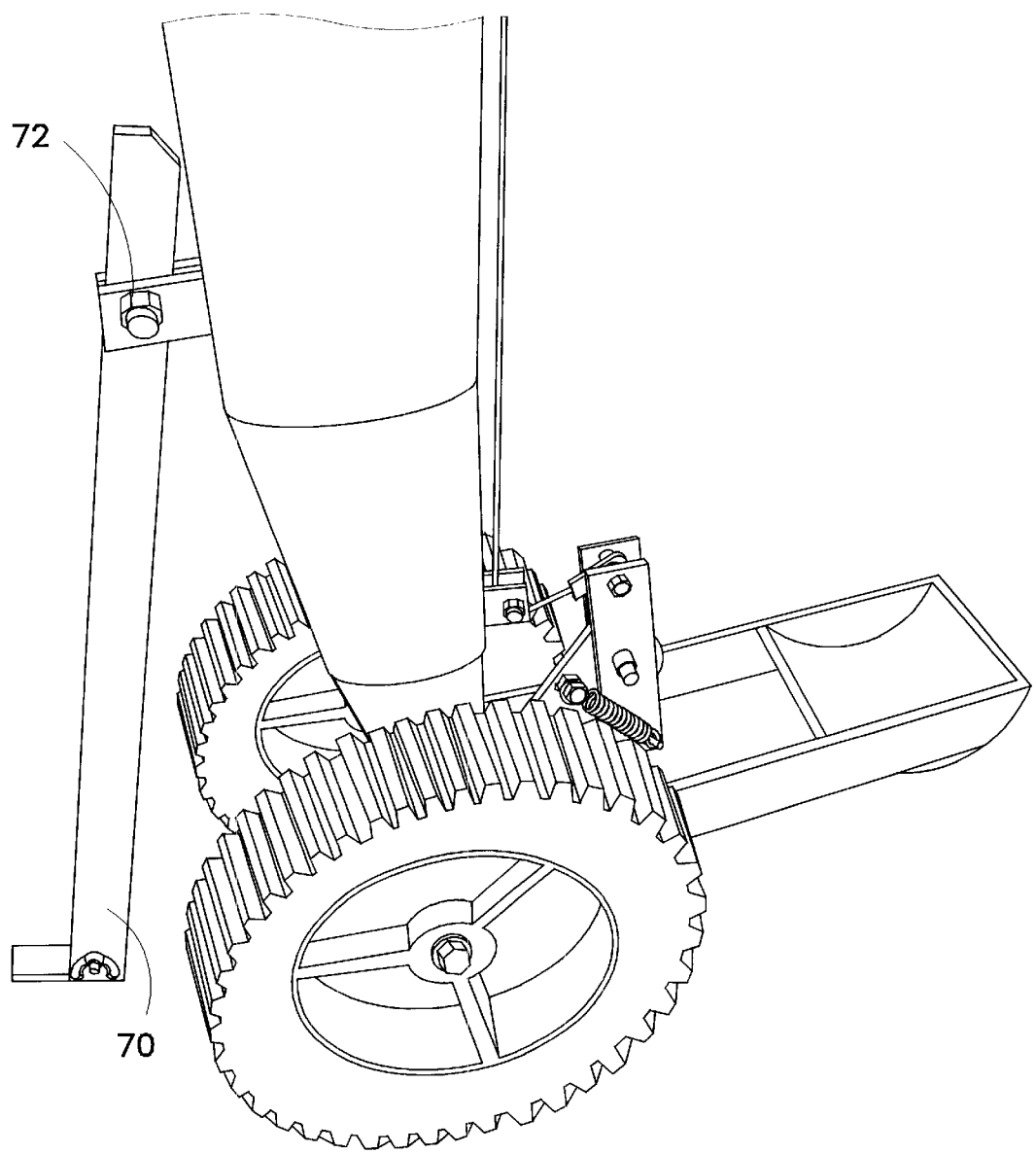
FIG. 4 is a side view of the lower portion of the device shown in FIG. 1, with kickstand added.

FIG. 4 shows an improvement on the device of FIG. 1 by including a kickstand 70 pivotally mounted on ears 72 on the side of the hopper 12. Kickstand 70 enables the hopper to stay upright when not being used. The elevating of the smoother by the stop pins can be seen.

Figure 5:
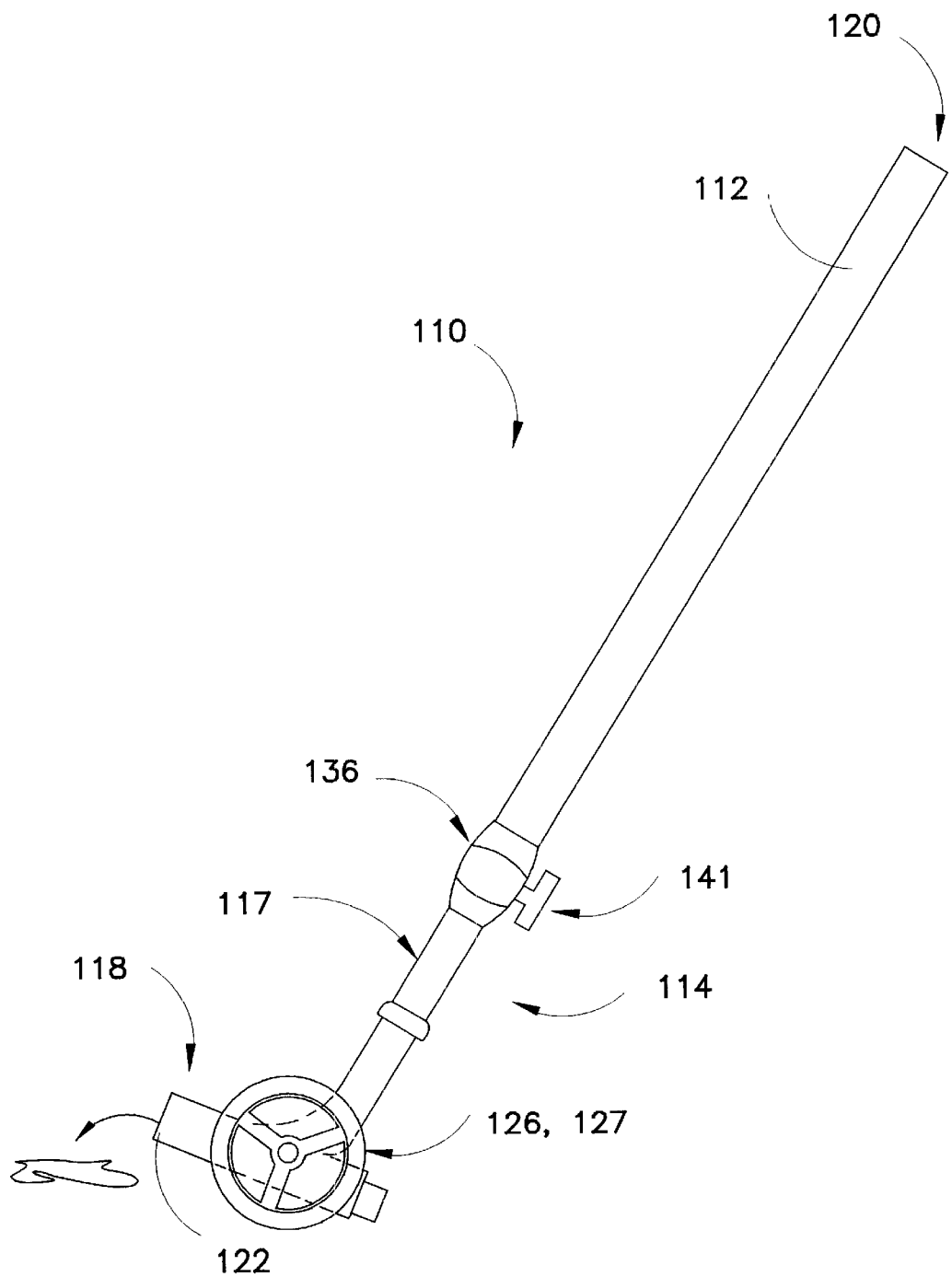
FIG. 5 is an elevation view of a divot repair apparatus according to a second embodiment of the invention.

A second embodiment is shown in FIG. 5. Like parts to those of the first embodiment are similarly numbered, but incremented by 100. The hopper 112 is generally cylindrical. The valve assembly 114 is substantially upstream of the outlet 122. The valve assembly 114 in this embodiment is a ball flow valve 136. The ball flow valve 136 is selectively operated by use of a knob 141. Downstream of the valve 136 is a further flow path 117 that allows the fill mixture to flow downwardly to a spot immediately above the divot to be filled. The path 117 has a J tube 118 attached at the downstream side of the path 117. A pair of wheels 126 and 127 is mounted onto the hopper 112 to allow for transport of the hopper across the ground.

This embodiment is used as follows: the fill mixture is placed into the inlet 120. The hopper 112 is wheeled adjacent to a divot to be filled. The operator dispenses an amount of fill mixture into the path 117 by opening and closing the valve 136. Once the path 117 has sufficient fill mixture, the operator rotates the hopper in a counterclockwise direction. In this manner, the fill mixture exits from the path 117 into the divot. Alternatively, the ball valve 136 may be set to be slightly open to permit the material to trickle down from the hopper 112 to the path 117 at a slow rate, comparable to the rate at which divot fill mixture is needed at the outlet 118 to fill a series of divots. That is, if five divots are to be filled per minute, needing a cup of mixture each, then a flow rate of five cups per minute at the valve 136 will assume a ready supply for each divot without overfilling.

Certain modifications and improvements will occur to those skilled in the art upon a reading of the foregoing description. By way of example, while it is preferred that the hopper be wheel mounted and either pulled or pushed, the hopper could be adapted to be transported by some other suitable carrier. Also, the dispensing valve, while it is preferred to be a gate valve, could also be a ball flow valve. It should be understood that all such modifications and improvements have been deleted herein for the sake of conciseness and readability but are properly within the scope of the following claims.

I claim:

1. A divot repair device for transporting a mixture of fill material and dispensing the fill material into divots in order to fill and thereby fix the divots by promoting turf growth in the location of the divots comprising:
   (a) a hopper for carrying a predetermined mixture of fill material, the hopper having an inlet and an outlet;
   (b) a wheeled carrier connected to the hopper for transporting the hopper by an individual across an area from one divot location to a second divot location;
   (c) a dispensing valve connected to the hopper for selectively dispensing the fill material including a gate valve which can be selectively opened and closed and a trigger located on the wheeled carrier and a cable connecting the trigger to the gate valve; and
   (c) a smoother connected to the hopper.

2. The apparatus according to claim 1 wherein the wheeled carrier further includes first and second wheels connected on opposite sides of the hopper and a handle connected to the hopper.

3. The apparatus according to claim 1 wherein the outlet is located at the lower end of the hopper.

4. The apparatus according to claim 1 further including a removable cover for the inlet.

5. The apparatus according to claim 1 wherein the dispensing valve includes an exit port located immediately adjacent to the divot location.

6. A divot repair device for transporting a mixture of fill material and dispensing the fill material into divots in order to fill and thereby fix the divots by promoting turf growth in the location of the divots comprising:
   (a) a hopper for carrying a predetermined mixture of fill material, the hopper adapted to be transported by an individual across an area from a first divot location to a second divot location;
   (b) a valve assembly connected to the hopper for selectively dispensing the fill material;
   (c) a dispenser exit for the hopper located above the divot locations when the hopper is transported adjacent the divot locations; and
   (d) a smoother pivotably connected to the hopper in such a manner that the smoother contacts the fill mixture after the fill mixture is dispensed and including a blade member having a leading edge and a trailing edge;
   whereby the hopper can be transported to a divot, the valve assembly can be actuated to open the dispenser exit, and dispense fill material into a divot to be repaired.

7. The apparatus according to claim 6 further including stop pins on the smoother, the stop pins located to restrict pivotable movement of the smoother in the downward direction.

8. A divot repair device for transporting a mixture of fill material and dispensing the fill material into divots in order to fill and thereby fix the divots by promoting turf grow in the location of the divots comprising:
   (a) a hopper for carrying a predetermined mixture of fill material, the hopper adapted to be transported by an individual across an area form a first divot location to a second divot location;
   (b) a valve assembly connected to the hopper for selectively dispensing the fill material;
   (c) a dispenser exit for the hopper located above the divot locations when the hopper is transported adjacent the divot locations; and
   (d) a smoother connected to the hopper in such a manner that the smoother contacts the fill mixture after the fill mixture is dispensed and including a blade member having a leading edge and a trailing edge; wherein the blade member further includes a bottom surface and the leading edge is curved upwardly from the bottom surface,
   whereby the hopper can be transported to a divot, the valve assembly can be actuated to open the dispenser exit, and dispense fill material into a divot to be repaired.

9. A divot repair device for transporting a mixture of fill material and dispensing the fill material into divots in order to fill and thereby fix the divots by promoting turf growth in the location of the divots comprising:
   (a) a hopper for carrying a predetermined mixture of fill material, the hopper adapted to be transported by an individual across an area from a first divot location to a second divot location;
   (b) a valve assembly connected to the hopper for selectively dispensing the fill material;
   (c) a dispenser exit for the hopper located above the divot locations when the hopper is transported adjacent the divot locations; and
   (d) a smoother connected to the hopper in such a manner that the smoother contacts the fill mixture after the fill mixture is dispensed and including a blade member having a leading edge and a trailing edge; wherein the blade member further includes a bottom surface and the trailing edge is curved upwardly from the bottom surface;

whereby the hopper can be transported to a divot, the valve assembly can be actuated to open the dispenser exit, and dispense fill material into a divot to be repaired.

10. A divot repair device for transporting a mixture of fill material and dispensing the fill material into divots in order to fill and thereby fix the divots by promoting turf growth in the location of the divots comprising:

(a) a hopper for carrying a predetermined mixture of fill material, the hopper having an inlet and all outlet;

(b) a wheeled carrier connected to the hopper for transporting the hopper by an individual across an area from one divot location to a second divot location;

(c) a dispensing valve connected to the hopper for selectively dispensing the fill material wherein the dispensing valve includes a gate valve which can be selectively opened and closed by hand operation; and (d) a smoother connected to the hopper positioned behind the wheeled carrier in a normal direction of travel in such a manner that the smoother contacts and smooths the fill material after the fill material is dispensed.

11. A divot repair device for transporting a mixture of fill material and dispensing the fill material into divots in order to fill and thereby fix the divots by promoting turf growth in the location of the divots comprising:

(a) a hopper for carrying a predetermined mixture of fill material, the hopper having an inlet and an outlet;

(b) a gate valve connected to the outlet;

(c) a wheeled carrier connected to the hopper;

(d) a trigger located on the wheeled carrier;

(e) a cable connecting the trigger with the gate valve; and (f) a smoother connected to the hopper in such a manner that the smoother contacts the fill mixture after the fill mixture is dispensed.

* * * * *